United States Patent [19]

Piukovich et al.

[11] 4,376,129

[45] Mar. 8, 1983

[54] SELF-DEGRADING COMPOSITION AND FODDER

[75] Inventors: Sándor Piukovich; Lajos Stankovics; Tibor Kiralyhidi, all of Budapest, Hungary

[73] Assignee: Chinoin Gyogyszer es Vegyeszeti Termekek Gyara Rt., Budapest, Hungary

[21] Appl. No.: 218,204

[22] Filed: Dec. 19, 1980

[30] Foreign Application Priority Data

Dec. 29, 1979 [HU] Hungary ............................. CI-2003

[51] Int. Cl.³ .............................................. A23K 1/00
[52] U.S. Cl. ...................................... 426/64; 426/622; 426/635; 426/520; 426/237; 426/448; 426/449; 426/510
[58] Field of Search ................... 426/53, 54, 61, 623, 426/630, 635, 520, 448, 449, 237, 636, 510, 64, 622

[56] References Cited

U.S. PATENT DOCUMENTS

| | | | |
|---|---|---|---|
| 3,617,300 | 11/1971 | Borochoff et al. | 426/53 |
| 3,950,543 | 4/1976 | Buffa et al. | 426/53 |
| 4,010,073 | 3/1977 | Drake | 426/64 |
| 4,254,150 | 3/1981 | Fritze et al. | 426/53 |

FOREIGN PATENT DOCUMENTS

2127831 6/1970 Fed. Rep. of Germany .
1379116 1/1975 United Kingdom .

OTHER PUBLICATIONS

Hawley, Gessner G., *The Condensed Chemical Dictionary*, 10th Ed., Van Nostrand Reinhold Co., N.Y. 1981, p. 316.
Reed, Gerald; *Enzymes in Food Processing*, 2nd Ed., Academic Press, 1975, p. 68.

*Primary Examiner*—Raymond N. Jones
*Assistant Examiner*—Elizabeth J. Curtin
*Attorney, Agent, or Firm*—Karl F. Ross; Herbert Dubno

[57] ABSTRACT

The present invention relates to a process for the preparation of a "self-degrading" composition suitable for use in feeding and/or feed-conversing purposes and if desired for the conversion thereof into a self-degrading fodder mixture which comprises pre-degrading the starch being present in cereal fodder and/or maize fodder to an extent that the degradation index of the crop should be from 0.12 to 0.27, and thereafter admixing the so-called "available starch" thus obtained in finely ground form in optional order of succession with α-amylase and optionally with further additives and—if "self-degrading" fodder mixture is to be prepared—with fodder.

The composition of the present invention provides carbohydrates utilizable by the digestive organs of animals. The process of the invention provides products equivalent with the very expensive maltodextrins using cheap and readily available starting materials.

8 Claims, No Drawings

SELF-DEGRADING COMPOSITION AND FODDER

This invention relates to a process for the preparation of a "self-degrading" composition which can be used for feeding and/or fodder-preserving purposes and if desired for the conversion thereof into a "self-decomposing fodder-mixture" which comprises subjecting starch being present in cereal- and/or maize-fodder to pre-degradation in such a manner that the degradation index of the cereals should fall between 0.12 and 0.27, and thereafter admixing the so-called "available starch" thus obtained in finely ground form in any order of succession with α-amylase and optionally with further additives and—when a "self-degrading fodder-mixture" is to be prepared—with fodder.

It is known that as a carbohydrate source for feeding purposes starch-containing agricultural cereals are available in the largest amount. It is known further that starch in natural form in the cereals is not soluble in water. The degradation of starch to water-soluble carbohydrates being utilizable by the organism of the animals takes place in the intestinal canal; but the digestibility of this product is far from being complete. Starch particles which did not sustain structural damage are not degraded and the degradation is very slow [J. Flour and Animal Feed Milling 157, page 6 [1975]]. Young animals, particularly those having one stomach (such as pigs, poultry) need therefore great amounts of feeds the starch content thereof being already converted into pre-degraded carbohydrates readily utilizable by the digesting fluids.

The useful conversion of water-insoluble starch in the digesting procedure is incomplete and highly variable, depending on the type and age of the animals; moreover the decomposition into water-soluble carbohydrates requires energy too. The digesting organs of ruminants can attack degraded starch much more easily [Biochem. 86, 452 [1963]].

As a result of wet thermal-treatment starch gelatinizes and becomes more readily digestible. Flocculation carried out with steam, however, increases the digestible energy content of barley and wheat but by 3% and 1% respectively and beside this the nitrogen retention is reduced to a significant extent.

For the reasons stated above rapidly and completely utilizable carbohydrates are recommended for use in the preparation of fodders, since the greatest part of carbohydrates is in a form available to the digesting fluids already at the beginning of feeding. A further advantage of such carbohydrates is that they often exhibit a favorable effect on digestion [USA Pat. No. 3,988,483]. Such substances are e.g. the molasses being available but in restricted quantities and various lower-grade fodder sugars obtained by the hydrolysis and saccharification of starch with the aid of relatively expensive methods. These mixtures comprising mainly mono- and disaccharides can be used, however, restrictedly, since when administered in large amounts, side-effects (e.g. diarrhea) occur [J. Anim. Sci. 3 [1970]].

As carbohydrates for animal breeding maltodextrines consisting of water-soluble saccharides and dextrins obtained by the aqueous enzymatic hydrolysis of starch proved to be the most suitable. The utilization of such maltodextrines is practically complete, they can be used in fodder between wide quantitative ranges without damaging the organs of the digesting system or causing difficulties in the formulation of the fodder or food-preparations. The wide-spread application of fodder-sugars and maltodextrins is, however, hindered by the fact that these substances are obtained by expensive processes.

Maltodextrins are prepared by subjecting a substrate of high starch content to hydrolysis with the enzyme α-amylase in aqueous medium [Belgian Patent No. 656,171].

The above process is as follows: the raw materials are ground to a flour having a fine very fine particle size, then admixed with so much water that a suspension having a dry substance content of 25 to 42% should be formed—depending on the properties of the raw material—the pH is adjusted to the optimal of the α-amylase enzyme used, the enzyme is added and heated in a closed batch-wise or continuous mixing apparatus to a temperature being at least as high as the gelatinization temperature of the starch—the so-called liqufaction—takes place within 20 to 120 minutes from the point of time when the gelatinization temperature has been reached; an aqueous mixture is obtained, the degradation rate thereof depending on the conditions used. In most cases it is not expedient to carry out complete saccharification, but one may proceed preferably by introducing the mixture having a controlled degradation rate onto a drier—e.g. onto a spray-drying apparatus—to obtain a solid product. Complete saccharification is carried out in a further step by using an amyloglucosidase enzyme and choosing a suitable reaction time.

The aqueous enzymatic hydrolysis of starch can be characterized as complicated methods having a high water, steam and energy consumption. The degraded starch is obtained as a slurry which is to be brought into dry and solid form by evaporating the water used for degrading. A further drawback of the said procedures is that the demands for apparatus, buildings and area are considerable.

As a consequence of the above deficiencies other processes were developed for the improvement of the digestability of starch-containing cereals. Such procedures are as follows contacting the cereals with hot air, the so-called "popping" [J. Anim. Sci. 42, No. 2. February [1976], pages 365–374], heating and flocculation with the aid of steam, husking [pearling] and flocculation carried out with steam, expansion-extrusion [U.S. Pat. No. 3,642,489] and the so-called "micronization" which comprises infrared irradiation [British Pat. No. 1,379,116].

A more simple variable of the above dry methods is the cold rolling and that of the hydrothermal methods; the low efficiency of the said methods and the technical difficulties involved did not allow however, the wide-spread application thereof.

The object of the thermal treatment methods is to gelatinize starch in order to make the carbohydrates of the feed more susceptible to degradation by the enzymes being present in the organism of the animals.

The improved degradation of gelatinized starch per se does not provide water soluble carbohydrates utilizable by the maw of the animals. Similarly to starch the products thus treated do not admix with the enzymes of the organism, their availability is limited and therefore the carbohydrate utilization is not equivalent to that of maltodextrin.

According to our best knowledge the natural starch content of cereals can be degraded into dextrins and sugars only in aqueous suspension and at a temperature being not lower than the gelatinization temperature of starch i.e. under hot conditions. As the first step of degradation the crystalline structure becomes loose, the product is in intensive contact with the enzyme on a large surface area and becomes chemically and physically available to the effect of the enzyme.

It is an object of the present invention to elaborate a process for making soluble the starch content of maize and wheat grains thus providing a product being equivalent to maltodextrin mixtures by a simple and cheap method suitable for mass production too.

According to the given state of the art this qualitative and application requirement is the primary degradation of starch into dextrins whereby the presence of a small amount of mono- and disaccharides (3-25%) is still allowed (French Pat. No. 1,497,881).

It is an object of the present invention to eliminate all the drawbacks of degradation carried out in aqueous medium. We have studied whether when a substrate being solid or at most swollen with moisture is subjected to a thermal procedure is it possible to obtain a degradation which provides a product equivalent to that obtained by an aqueous hydrolysis method.

In accordance with other tests [Mühl und Mischfuttertechnik, 111, 39, 594–598 [1974]] it has been found that a small amount of water soluble carbohydrates being insignificant from the technical point of view can be detected in the products obtained by popping and hydrothermal methods and also in micronized products. From this respect extrusion is the most effective method, whereby in some cases the amount of water soluble carbohydrates includes a maximal value of 12%.

We have examined further whether is it possible to find among the possible products of thermal gelatinizing methods a substance which can be effectively and rapidly degraded with enzyme (s) in a neutral aqueous medium not only under hot conditions but at room temperature too. We have determined by the methods described in the present specification the viscosity of such starting materials and the refraction of aqueous mixtures prepared therefrom in the presence of α-amylase of various origin and added in different concentration.

The conversion of starch-containing cereals, being mainly in amorphous form after gelatinization and also subjected to mechanical degradation by grinding, into water soluble carbohydrates in neutral aqueous medium, at room temperature with the aid of α-amylase takes place in very different ways depending on the method used for the thermal pre-degradation of starch and the conditions thereof. In Table 1 a comparative test is shown as an example of cereals brought into forms suitable for rapid self-degradation.

We have chosen different working-up methods and subjected the different starch-containing products to various effects. Thus in extrusion methods cereal grains having varying water content were subjected to the action of different temperatures and pressures, the time of treatment is varied too and the behavior of the thus pre-degraded starch towards α-amylase enzyme is observed.

It has been found that the product can be brought into a particular state which is particularly suitable for obtaining a substance described in the present specification by admixing and activating with an α-amylase enzyme. The parameters of the thermal pre-degradation methods (moisture content, temperature, pressure, time etc.) are varied in a manner as to provide a substrate which can be decomposed by α-amylase to the highest possible extent.

The present invention is based on the recognition that all the substances which contain thermally pre-degraded starch and have a "degradation index" of $J = 0.12$ to $0.27$ are suitable for the preparation of the self-degrading end-products of the present invention.

According to the present invention the "degradation index" is determined as follows:

Viscosity is measured three minutes after putting the thermally treated substrate into water according to the method described in paragraph 2 of the "Experimental methods" (see e.g. Table 1, "B"). A parallel measuring is carried out in the presence of an α-amylase enzyme having an activity of 5000 SKB/g (see e.g. Table 1, "A"). The quotient of the two viscosity values obtained is the "degradation index". It can be expressed by the following equation (see $J =$ degradation index):

$$J = A/B$$

The above recognition enables the controlled selection of parameters of thermal procedures so that the thermal treatment provides starting materials suitable for the preparation of the self-degrading products of the present invention. In order to make a distinction between substances having such a degradation index and the broad range of thermally treated starch-containing substrates the products having a suitable degradation index are referred to furtheron as "available starch".

The refraction of water or aqueous solutions admixed with available starch does not change to a considerable extent even after several days. On the other hand when α-amylase enzyme is admixed with available starch and the mixture is suspended in water quick formation of water soluble carbohydrates can be observed.

On the activating effect of α-amylase the mixture shows self-degrading properties. In the fifth minute after having been placed into water the refraction value of the activated self-degrading mixture is by 6 to 40% higher than that of the available starch not activated with an enzyme (see "Experimental methods", paragraph 3).

As a result of the rapid hydrolysis in a neutral medium at room temperature the dry substance content of the self-degrading composition of the present invention when placed into water soon reaches the minimal ¾ parts of water soluble carbohydrate ratio being characteristic of technical grade maltodextrins.

According to this specification a composition comprising available starch and α-amylase enzyme is considered to be "self-degrading" if in the fifth minute after having been placed into water the refractory value thereof is by 8 to 40% higher than that of available starch not activated with an enzyme.

Comparative tests carried out in the field of cereals brought into a condition suitable for rapid self-degradation are disclosed in Table 1.

TABLE 1

| Sign Thermal treatment | Viscosity 3. minute cps | Refraction in dry substance % 5. minute | Degradation index A/B |
|---|---|---|---|
| Micronized maize | | | |
| with 0.15% of | | | |
| Bact. amylase | | | |
| A (5000 SKB/g) | 301 | 32 | 0.137 |

TABLE 1-continued

| Sign Thermal treatment | Viscosity 3. minute cps | Refraction in dry substance % 5. minute | Degradation index A/B |
|---|---|---|---|
| B without amylase | 2200 | 4 | |
| Micronized wheat | | | |
| A | 460 | 14 | 0.192 |
| B | 2400 | 4.8 | |
| Extruded maize | | | |
| A | 3000 | 68 | 0.155 |
| B | 19400 | 12 | |
| Steamed-flocculated oat | | | |
| A | 56 | 10 | 0.270 |
| B | 206 | 2 | |
| Exploded maize | | | |
| A | 2800 | 16 | 0.152 |
| B | 18400 | 2.4 | |

For the preparation of self-degrading fodder compositions suitable for the conversion of starch-containing substances into water soluble carbohydrates amylase enzymes produced by microbiological methods can be used and particulary those having a high amount of α-amylase component.

In the preparation of the self-degrading composition of the present invention pre-degradation can be carried out by dry thermal and/or hydrothermal procedures such as treatment with infrared irradiation, popping, heating and flocculation with steam, husking (pearling) and flocculation with steam, expansion-extrusion, cold rolling and/or explosion.

According to the process of the present invention the pre-degraded starch having a suitable degradation index—the so-called available starch—is subjected to fine grinding and brought to a particle size of 50 to 1,500μ, preferably 100 to 600μ.

According to the process of the present invention commercially available α-amylase enzyme having an activity of 5000 SKB/g can be used preferably in an amount of 0.1-2% based on the dry starch content of the ground available starch. If an enzyme having a different activity is applied, it is used in a corresponding amount falling within the above interval.

Further additives can also be added to the composition in any order of succession. Thus additives stimulating and improving the enzyme effect and stabilizers can be used, such as alkaline earth metal chlorides and alkali metal chlorides, particularly calcium chloride and sodium chloride. Compounds having a buffer effect can be added as well e.g. calcium carbonate, water soluble hydrogen carbonates or phosphates.

Biologically active compounds generally used in feeding can also be added to the composition.

Trace elements and salts and/or oxides thereof (e.g. iron, manganese, copper, selenium, zinc and cobalt salts and oxides) play an important role among the further additives.

According to the present invention there is provided a process for the preparation of a self-degrading fodder mixture. The said mixture is prepared by admixing a self-degrading composition with the fodder. The amount of the self degrading composition amounts to 5-85% by weight related to the dry substance content of the fodder. One may also proceed by adding an equivalent amount of available starch and α-amylase enzyme to the fodder.

The self-degrading composition can also be prepared by admixing the two main components directly before use either before contacting with the aqueous medium or simultaneously in the presence of water.

The composition and mixture of the present invention eliminates in most cases the use of fodder sugars or dextrin finished products.

As a result of the present invention an actual need is satisfied in a very simple way. The self-degrading compositions can be admixed with fodders and complemented with practically all the substances used in feeding such as fodders of vegetable or animal origin enriched in carbohydrates, fibres or proteins; fats, salts "nonprotein nitrogen" substances, premixes etc. generally used in fodders. The use of the self-degrading compositions does not encounter difficulties, the preparation of the fodder formula does not require any special measures but their application ensures the controlled water soluble carbohydrate content required in such feeds.

The self-degrading composition is converted into water soluble carbohydrates in vitro in neutral medium at room temperature and the practical conditions of feeding. Thus the composition according to the present invention exhibits the same effect and is just as suitable as the isolated sugars, dextrins and mixtures thereof. No special measures are required to induce the said spontaneous transformation as would have been needed by the use of the powdered maltodextrin.

The significance of the degradation index utilized by the present invention resides in the fact that by simple variation of the technical parameters of thermal pre-degradation procedures—aimed at the improvement of the digestibility of starch—the process becomes suitable for the use of products containing available starch and having a quality as defined in the present specification i.e. for the use of such substrates and conditions in which the pre-degraded product is particularly adapted for the formation of a self-degrading mixture even in a neutral cold aqueous medium.

The modification of the structure of starch in the degradation index interval of 0.12 to 0.27 as claimed is not limited by any theoretical consideration.

According to the process of the present invention the self degrading composition can be manufactured in a batch-wise manner or preferably in a continuous production line. Farms having no industrial plant can also run such a production line e.g. by using a self-degrading step combined with micronization. The consumers can prepare the self-degrading mixture on the spot of feeding by admixing the activating enzyme and all the other components. This plays an important role in the reduction of the costs of location, machinery and transportation.

The above advantages show how simple the process of the present invention is. It can be carried out by using known and operating equipment, apparatus and machinary, its steam and water demand is next to nothing or practically nought. Very little labor is needed to handle the equipment and the electrical energy demand is negligible over that required by the fodder mixer. The capacity of the production line is large and can be varied e.g. with the aid of the speed of the micronization band and the size of the mechanical, grinding and homogenizing machines. The time of treatment is short and this means that all the advantages of a continuous production can be utilized. The establishment of such production lines is accompanied with much lower demands for territory, public utility and buildings than the known aqueous hydrolytic methods.

Further details of the present invention are to be found in the Examples without limiting the scope of protection to these Examples.

EXAMPLE 1

Maize grains are spread out in a layer having an average thickness of 3.5 cm on a continuous belt conveyor; the band is a metal cloth and the moisture content of the maize amounts of 18%. The band moves with such a speed that the grains stay for an average 3 minutes on the belt. In a height of 35 cm above the band an incandescent body is fixed which irradiate the maize with infrared light having a wave length interval of 2–4 microns and a frequency of $0.9 \times 10^9$ megacycles/sec; the said body is of the structure as disclosed in British Pat. No. 1,379,116 and consists of a gas fired series of ceramic plates. The intensity of the infrared radiation is regulated by the number of the plates in such a manner that the temperature of the material leaving the band should be 80° to 85° C. The irradiated material is immediately introduced onto continuously flattening rolls, where it is rolled to lamellar bodies having a thickness of 1 to 1.5 mm. The bodies are then passed through the cloth of a vibrating sieve and cooled to 20° to 35° C. with a cold air current. The material is then subjected to continuous disintegration; the solid available starch thus obtained does not contain granules of a particle size above 600 microns and has a degradation index of $J = 0.155$ to $0.160$.

In a counter current flush mixer providing a homogenity of 1:100.000 $\alpha$-amylase having bacterial origin having an activity of 5000 SKB/g is admixed with the product; the finely powdered $\alpha$-amylase is added in an amount of 1580 g per 1000 kg of dry substance. The product thus obtained is packed. The $\alpha$-amylase enzyme activity of the self-degrading composition thus obtained corresponds generally to a value of 10 SKB/g starch, related to the initial starch content.

The product thus obtained can be used e.g. for the preparation of wet alfalfa and grass silo; it can be added in an amount of 4% based on the weight of the ensilaged material. The conventional ensilaging methods are used and intensive stirring is used. The lactic acid formation is three times higher than that of a control silo and this improvement is accompanied by the very pleasant smell of the ensilaged material and the stable constant characteristic values thereof. Animals received simultaneously a fodder ensilaged by using the self-degrading composition of the present invention and a normally ensilaged control feed; the animals consumed 4 to 5 times more of the first fodder than of the control feed.

EXAMPLE 2

A self-degrading composition is prepared in an analogous matter to Example 1 except that the maize is replaced by coarse grist thereof enriched in starch and having a moisture content of 15% obtained e.g. in a maize degerminating apparatus. The degradation index of the available starch thus obtained amounts to $J = 0.195$ to $0.200$.

The finely ground product containing no granules above a particle size of 600 microns is homogenized with $\alpha$-amylaze enzyme in a ratio described in Example 1.

The self-degrading composition obtained according to this Example enables the use of urea in ruminant fodders in a larger amount. To 500 kg of the self-degrading composition 83 kg of foddy urea are added.

The mixture thus obtained can be used as masting-lactating concentrate for cattle, sheep and goat; the animals can receive from this concentrate a daily amount of 2 g/kg bodyweight without the risk of intoxication, irrespective of the species and age of the animal. By adding this composition to conventional animal fodder 42 to 46% of the protein demand of the animals can be covered by non-protein nitrogen substance—contrary to the value of 20 to 25% achieved in conventional animal breeding.

EXAMPLE 3

Wheat cereal crop having a moisture content of 24% is worked up as described in Example 1 except that the material is spread over on the band in a 8 cm thick layer, the crop is turned over on the band with the aid of baffle plates, the material stays on the band for an average 8 minutes and is irradiated with infrared radiation falling into a wave length interval of 1.8 to 2.5 microns. The intensity of the radiation is regulated by the heating of the incondecent body, the temperature of the material when leaving the band is higher than 85° C. but does not exceed 90° C. The degradation index of the cooled and ground available starch amounts to $J = 0.121$ to $0.125$.

The product thus obtained is admixed uniformly with such an amount of $\alpha$-amylase enzyme that the activity of the self-degrading composition should be the same as disclosed in Example 1.

The self-degrading mixture thus obtained can be preferably used e.g. in lactic acid fermentations by preparing therefrom with water a suspension having a dry substance content of 10%, raising the temperature to 45° C. and inoculating with a thermophilic Lactobacillus culture. Furtheron one may work in accordance with conventional lactic acid manufacturing technology. The fermentation broth gives a product suitable for the preparation of lactic acid, feeding purposes, conserve-making and also for the production of animal feed having a good dietetic value.

EXAMPLE 4

The self-degradation composition prepared according to Example 1 is admixed with an amount of 400% by weight of corn-stalk, alfalfa or chopped straw, the mixture is wetted, allowed to stand for 20 to 120 minutes depending on the given field of application, granulated or dried on a fodder dryer.

The mixtures thus obtained are suitable for the preparation of fodder formulae for cattle, sheep and rabbit, whatever the simultaneous presence of a defined amount of fibre and water soluble carbohydrate is required. In the case of the animal species enumerated above the said degrading composition improves the digestibility of fodders rich in vegetable fibres and that of agricultural by-products by 10 to 32%.

EXAMPLE 5

Barley corn obtained directly by harvesting and having a moisture content of 30% is micronized by the process described in Example 3, whereupon it is worked up in an analogous manner to Example 1 to yield an available starch having a degradation index of 0.22 to 0.25. The available starch thus obtained is admixed with $\alpha$-amylase having an activity of 10 SKD/g starch value. Thus a self-degrading composition is obtained.

The composition is suitable per se for the wet feeding of animals having one stomach (such as pigs) as follows:

pig-wash is prepared by suspending the self-degrading mixture in 200% by weight of water, it is allowed to stand for 0.5 to 1 hour and fed to the pigs. The metabolizable energy amounts to 3850 Kcal/kg.

EXAMPLE 6

Standard commercial oat-flake prepared by pearling, digesting with steam and rolling—having a degradation index of J=0.23 to 0.27—is subjected to fine grinding and admixed with α-amylase enzyme. The activity of the self degrading mixture thus obtained amounts to 1 SKB/g starch value.

A very effective feed utilization and weight gain increase can be achieved by admixing the product thus obtained with rabbit feed in a ratio of 20 to 60%. The savings amount of 12 to 21% both when the value of protein and starch is taken into consideration.

EXAMPLE 7

1000 kg of maize grains having a moisture content of 30% are introduced into a maize exploding apparatus having a 2,000 l heating area; the maize is heated with 6 atm. hot steam for 40 minutes and injected into the explosion area through the discharge opening of the apparatus. The exploded and cooled maize is then comminuted to a grist having a particle size smaller than 600 microns and admixed with so much α-amylase enzyme that the activity of the self-degrading composition obtained from available starch corresponding to a degradation index of J=0.140 to 0.155 should be 100 SKB/g starch value.

From the product thus obtained at room temperature an aqueous suspension having a dry substance content of 20 to 35% is prepared which can be used in the production of fodder yeast as a water-soluble carbohydrate source; the suspension must be introduced into the microbiological procedure within a short time, e.g. an hour.

EXAMPLE 8

Commercial wheat meal is treated according to the process described in Example 3 except that the material moving on a metal cloth conveyer belt free of gaps in a 5 cm thick layer is turned over with baffle plates and irradiated with infrared light for 5 minutes, whereafter it is cooled and ground to yield an available starch having a degradation index of 0.12 to 0.13. This product is admixed with α-amylase to give a self-degradating product having an activity of 10 SKB/g starch value. This product can be used in the baking industry for the preparation of an auxiliary agent which accelerates the rising and leavening of knead dough by adding the self-degrading composition to a double-fold amount of water under stirring within a period of half an hour, and drying the thick slurry thus obtained by spraying the same into a drying apparatus; the inlet temperature amounts to 180° C., the outlet temperature is 85° to 90° C. and a fine powder is obtained. In the baking industry this product provides the readily degradable carbohydrates needed for rising and the functioning of the enzyme and it exerts a beneficial effect on the formation of the structure of the bread. When added to the flour before leavening in an amount of 3–5% it shortens the rising time by 30 to 50%.

EXAMPLE 9

The coarse grist or flour of maize grains having a moisture content of 25% is heated to 200° to 220° C. and exposed in an extrusion apparatus to the effect of a temperature of 350° C. and a pressure of 450 atm. at the extrusion head. A jelly-like product leaves the extrusion apparatus in the form of long rods which are cut off, dried and comminuted to a particle size below 600 microns. The available starch having a degradation index of J=0.18 to 0.20 is homogenized with α-amylase to yield a self-degrading composition having an activity of 60 SKP/g starch value.

The product thus obtained is converted into an aqueous suspension having a dry substance content of 30%. When added to wine-lees in a weight ratio of 1:1 it enchances alcoholic fermentation and yields alcoholic distillates having a high carbohydrate utilization and a good organoleptic quality in a very economic manner.

EXAMPLE 10

A starter feed for young pigs is prepared as follows:

In a fodder mixer providing a homogenity of 1:100.000 250 kg of the available starch disclosed in Example 1 and 240 kg of the available starch disclosed in Example 5 are admixed with 50 kg of bran, 180 kg of extracted soya grits, 20 kg of flax-seed meal, 200 kg of powdered skimmed milk, 20 kg of dextrose, 20 kg of premix for young pigs, 20 kg of buffer and a stabilizer having the following composition:

35% of feed-grade calcium dihydrogen phosphate
35% of calcium carbonate
10% of calcium chloride
14% of sodium chloride
8% of α-amylase produced by a microbial method/activity; 5000 SKB/g starch value.

The 5% suspension of the buffer and the stabilizer in distilled water has a pH value of 6.3 and possesses adequate buffer capacity both in acidic and alkaline medium.

1000 kg of the starter feed for young pigs thus obtained are packed in sacks coated with polyethylene; each sack contains about 40 kg of the starter feed. The sacks are to be stored under the exclusion of moisture until used.

The data of the starter feed are summarized in the following Table:

| Metabolizable energy | Kcal/kg | 3150 |
|---|---|---|
| Starch value | | 73.3 |
| Moisture content | % | 10.8 |
| Crude protein | % | 22.1 |
| Lysine | % | 1.3 |
| Methionine | % | 0.43 |
| Methionine + cystine | % | 0.76 |
| Crude fats | % | 1.85 |
| Crude fibres | % | 3.10 |
| Calcium | % | 1.5 |
| Phosphorous | % | 0.92 |
| Chloride | % | 0.62 |
| Ash content | % | 7.30 |
| α-amylase activity | SKB g/starch value | 8.0 |

EXAMPLE 11

A masting feed for pigs is prepared by admixing in an apparatus and by the method described in Example 10 640 kg of the available starch according to Example 1, 150 kg of the available starch according to Example 5, 80 kg of bran, 50 kg of extracted soya grits, 30 kg of flax-seed meal, 20 kg of masting premix and 30 kg of the buffer and stabilizer composition according to Example 10; the total weight of the feed amounts to 1,000 kg.

The masting feed may be used preferably as follows: 1000 kg of the masting feed are suspended in 2,000 l of water in a vessel equipped with a stirrer with the aid of the circulating centrifugal pump and the suspension is added to the animal feeder apparatus. The characteristic data of the feed are disclosed in Table 2.

EXAMPLE 12 of available starch according to Example 5, 450 kg of fish meal, 150 kg of extracted soya grits, 100 kg of meat metal, 12 kg of a premix for trouts, and 8 kg of the buffer and stabilizer composition according to Example 10. The total weight of the feed amounts to 1,000 kg. The feed thus obtained is pelletted by the method disclosed in Hungarian Patent Application Ser. No. CI-1844 and stored with the exclusion of moisture.

The characteristic data of the feed are disclosed in Table 2.

TABLE 2

Characteristic data of the feed according to Examples 11, 12, 13, 14 and 15

| Data | Units | 11 | 12 | 13 | 14 | 15 |
|---|---|---|---|---|---|---|
| Metabolizable energy | Kcal/kg | 3220 | 3050 | 2335 | 2155 | 1980 |
| Starch value | | 74.2 | 73.2 | 57.2 | 55.2 | 58.8 |
| Moisture content | % | 12.0 | 10.5 | | 11.2 | 8.0 |
| Crude protein | % | 12.7 | 18.0 | 17.3 | 17.2 | 42.3 |
| Lysine | % | 0.52 | 1.7 | 0.45 | 0.71 | 2.08 |
| Methionine | % | 0.22 | 1.0 | 0.21 | 0.35 | 0.88 |
| Methionine + cystine | % | 0.41 | 1.1 | 0.39 | 0.61 | 1.07 |
| Crude fats | % | 3.2 | 3.2 | 2.70 | 2.0 | 2.5 |
| Crude fibres | % | 4.1 | 5.2 | 14.2 | 14.5 | 5.0 |
| Calcium | % | 1.2 | 1.6 | 1.32 | 1.14 | 1.02 |
| Phosphorous | % | 0.52 | 0.9 | 0.72 | 0.67 | 1.20 |
| Chloride | % | 0.50 | 0.71 | 0.65 | 0.51 | 0.92 |
| Ash content | % | 4.52 | 4.3 | 7.20 | 7.41 | 3.40 |
| $\alpha$-amylase activity | SKB/g starch value/feed | 12.0 | 10.0 | 4.0 | 6.0 | 3.2 |

A masting feed for calves is prepared by admixing in the apparatus and by the method described in Example 10 650 kg of the available starch according to Example 1, 240 kg of extracted soya grits, 70 kg of alfalfa meal, 15 of a starter premix for calves and 25 kg of a buffer and stabilizer composition according to Example 10. The total weight of the feed amounts to 1,000 kg.

The characteristic data of the feed are disclosed in Table 2.

EXAMPLE 13

A masting feed for lambs is prepared by admixing in the apparatus and by the method according to Example 10 400 kg of the available starch according to Example 1, 80 kg of the available starch according to Example 5, 140 kg of bran, 320 kg of maize green plant meal, 20 kg of urea, 30 kg of a masting premix for lambs and 10 kg of the buffer and stabilizer composition according to Example 10. The total weight of the feed amounts to 1,000 kg.

The characteristic data of the composition are disclosed in Table 2.

EXAMPLE 14

A masting feed for rabbits is prepared by admixing in the apparatus, and by the method described in Example 10, 140 kg of the available starch according to Example 1, 150 kg of the available starch according to Example 6, 200 kg of the available starch according to Example 3, 50 kg of extracted soya grits, 100 kg of extracted sunflower grits, 325 kg of maize meal, 20 kg of masting premix for rabbits and 15 kg of the buffer and stabilizer composition according to Example 10. The total weight of the feed amounts to 1000 kg.

The characteristic data of the feed are disclosed in Table 2.

EXAMPLE 15

A feed for trouts is prepared by admixing in the apparatus and by the method described in Example 10 280 kg

EXAMPLE 16

A composition suitable for the conservation of silo—first of all for use in papilionaceae—can be prepared according to the process of the present invention as follows:

In an apparatus and by the process described in Example 10 970 kg of available starch according to Example 2 are admixed with 33 kg of fermentation regulating additive, the mixture is packed and stored until use.

The characteristic data of the composition are as follows: $\alpha$-amylase activity 5 SKB/g; the viscosity of a 25% aqueous suspension amounts to 200 cps when determined according to the method described later on; increase of refraction index in a 25% aqueous suspension 18% when determined by the method described later on.

The fermentation regulating additive referred to at the beginning of this Example is prepared by admixing in a counter current flush mixer providing a homogenity of 1:100.000 the following components:
485 parts by weight of feed grade precipitated calcium carbonate
100 parts by weight of calcium chloride
300 parts by weight of sodium chloride
50 parts by weight of magnesium oxide
20 parts by weight of manganese sulfate
5 parts by weight of cupric sulfate
2 parts by weight of cobalt chloride
5 parts by weight of zinc sulfate and
33 parts by weight of $\alpha$-amylase enzyme prepared by microbial methods and having an activity of 5,000 SKB/g starch value.

The characteristic data of the above fermentation regulating additive are as follows: $\alpha$-amylase activity 165 SKB/g; the pH of a 5% suspension in distilled water at 20° C. is 7,0; buffer capacity: On titrating 100 ml of a 5% aqueous suspension with 34.6 ml of 0.1 N hydrochloric acid and 30.5 ml of 0.1 N sodium hydroxide, respectively, the pH changes by 0.5 units.

EXAMPLE 17

Wet conservation of Hungarian clover (Trifolium pratense var. pilosum L.) under industrial (plant) conditions by using the silo preservation composition according to Example 16.

Hungarian clover being in the budding flowering state average (dry substance content=18%) is comminuted by using a Heston-type moving chopping machine to a size of 2 to 3 cm, whereupon from a "Hedodocator" feeding machine mounted on the chopping machine 30 kg of the composition according to Example 16 per 1,000 kg of chaff are added. One must take care of the uniform admixing in the rotating drum of the chopping machine. The Hungarian clover admixed with the conservating agent is applied onto means of moving on the plot to be harvested with the same speed as the Heston apparatus by means of ventillation. The chopped and treated Hungarian clover is uniformly spread out in a so-called horizontal silo having a concrete foundation and walling and lined with chopped straw. When the thickness of the layer becomes 30 cm the clover is compacted by passing over it 3 or 4 times a Raba-Steiger type tractor. Thereafter a chopped barley or wheat straw of good quality is spread over the compacted clover in an amount of 15% based on the wet weight thereof. Treated red clover is spread over in a similarly thick layer and it is compacted again. This procedure is repeated until the thickness of the compacted silo layer reaches 2 m. Finally the silo is covered by a nylon foil or by a 25 cm thick layer of straw.

According to the above method about 2,000 tones of silo material can be stored in a horizontal silo having a size of 100×25×2 m. The fermentation gets to an end generally within two weeks. According to our measurements the fodder can be stored under such conditions for several years without any decrease of the nutritive value or deterioration of the organoleptic characteristics.

EXPERIMENTAL METHODS

The available starch and the self-degrading composition are prepared in the form of a powder having a particle size below 600 microns. In accordance with this requirement the samples are sieved e.g. by passing through a 636 microns mesh sieve of a series of sieves according to standard No. TGL 04188 of the German Democratic Republic.

(1) Determination of the Dry Substance Content of the Sample 10.0 g of the sample are dried in a graduated glass jar at 105°±1° C. until constant weight is achieved. Before weighing the sample is cooled in a vacuum dessicator over phosphorous pentoxide. The dry substance content is expressed by multiplying the constant weight with ten, as % of the dry substance content.

(2) Determination of Viscosity

A sample corresponding to 25.0 g of dry substance is weighed in and tempered at 25° C. under a closed cover for 15 minutes. An amount of water completing the dry substance weight of 25 g to 100.0 g is also weighed in and tempered under a closed lid at 25° C. The sample is added to water under vigorous stirring and the suspension having a dry substance content of 25% and a temperature of 25° C. is filled into the dish of a viscosimeter two minutes after the admixture of the sample with water. For the measurement a RN type Searle-Coutte cylinder system rotation viscosimeter, manufactured in the GDR is used. The viscosimeter can be used for determination in an interval of 1 to 10.000 cP with a margin of error of ±3%; the constant temperature is ensured with the aid of an ultrathermostat (±0.1° C.). The temperature of measuring amounts to 25° C., the measuring is carried out three minutes after the addition of the sample into water.

(3) Determination of Refraction

Refraction is measured by using a suspension of the sample prepared according to paragraph 2. (dry substance content 25%) except that tempering and measuring are carried out at 20° C. and the refraction is determined five minutes after placing the sample into water. The measuring is carried out by using a refractometer manufactured by the firm VEB Carl-Zeiss, equipped with an ultrathermostat providing a constant temperature within the range of ±0.1° C.

The refraction value is referred to the dry substance content and is the measured value multiplied by four.

Remark

The designation "SKB/g starch value" used throughout the specification is an internationally accepted and applied unit of measurement of the α-amylase activity.

We claim:

1. A process for making a dry, self-degrading composition capable of activation in the presence of water and promoting the degradation of fodder substances, said process comprising:
    (a) heating an amylaceous cereal or maize to thermally predegrade it to a degradation index of 0.12 to 0.27 thereby converting it into solid, available starch;
    (b) grinding the solid, available starch formed in step (a) to a particle size of 50 to 1500μ; and
    (c) admixing the ground, solid, available starch with finely divided powdered alpha-amylase to produce said dry self-degrading composition.

2. The process defined in claim 1, further comprising:
    (d) dry packing the composition of step (c).

3. The process defined in claim 1, step (a), which comprises predegrading the amylaceous cereal or maize by dry thermal or hydrothermal methods selected from the group consisting of infrared radiation, popping, heating and flocculation with the aid of steam, husking, expansion-extrusion, cold-rolling and explosion.

4. The process defined in claim 1, step (b), wherein the solid, available starch is ground to a particle size of 100 to 600μ.

5. The process defined in claim 1, step (c), which comprises using commercial alpha-amylase enzyme having an activity of 5,000 SKB/g in an amount of 0.1 to 2% by weight, related to the dry starch substance weight of the ground starch, or an enzyme having another activity in an amount equivalent thereto within the limits of the above interval.

6. The process defined in claim 1, further comprising:
    (e) adding a compound selected from the group consisting of calcium chloride, sodium chloride, calcium carbonate, a water-soluble hydrogen carbonate and a water-soluble hydrogen phosphate.

7. The process defined in claim 1, further comprising:
    (f) adding a salt or ozide of iron, manganese, copper, selenium, zinc or cobalt.

8. A process for the preparation of a degraded fodder substance which comprises mixing fodder with 5 to 85% by weight of the self-degrading composition defined in claim 1 base on the dry substance content thereof.

* * * * *